United States Patent [19]

Jacobson et al.

[11] Patent Number: 5,065,300

[45] Date of Patent: Nov. 12, 1991

[54] CLASS E FIXED FREQUENCY CONVERTER

[75] Inventors: Boris S. Jacobson, Plaistow, N.H.; Raymond A. DiPerna, Sherborn, Mass.

[73] Assignee: Raytheon Company, Lexington, Mass.

[21] Appl. No.: 666,770

[22] Filed: Mar. 8, 1991

[51] Int. Cl.[5] .......................................... H02M 3/335
[52] U.S. Cl. ....................................... 363/16; 363/71; 363/131
[58] Field of Search .................. 363/15, 16, 17, 24, 363/71, 131, 132, 134

[56] References Cited

U.S. PATENT DOCUMENTS

| | | | |
|---|---|---|---|
| 3,919,656 | 11/1975 | Sokol et al. | 330/51 |
| 4,449,174 | 5/1984 | Ziesse | 363/21 |
| 4,605,999 | 8/1986 | Bowman et al. | 363/21 |
| 4,607,323 | 8/1986 | Sokal et al. | 363/21 |
| 4,685,041 | 8/1987 | Bowman et al. | 363/40 |
| 4,805,081 | 2/1989 | Chambers et al. | 363/71 |
| 4,825,348 | 4/1989 | Steigerwald et al. | 363/132 |
| 4,853,832 | 8/1989 | Stuart | 363/71 |
| 4,855,888 | 8/1989 | Henze et al. | 363/17 |

OTHER PUBLICATIONS

Idealized Operation of the Class E Tuned Power Amplifier, Frederick H. Raab, IEEE Transactions on Circuits and Systems, vol. CAS-24, No. 12, Dec. 1977, pp. 725-735.
Steady State Analysis of Class E Resonant DC-DC Converter Regulated Under Fixed Switching Frequency, K. Harada, Wen-Jian Gu, Power Electronics Specialists Conference, Apr. 1988, pp. 3-8.
Class-E Combined-Converter by Phase-Shift Control, Chuan-Qiang Hu et al., Power Electronics Specialists Conference, PESC '89, Jun. 1989, pp. 229-234.
Class $E^2$ Narrow-Band Resonant DC/DC Converters, M. Kazimierczuk, J. Jozwik, IEEE Transactions on Instrumentation and Measurement, vol. 38, No. 6, Dec. 1989, pp. 1064-1068.
A 1 kW, 500 kHz Front-End Converter for a Distributed Power Supply System, L. H. Mweene, IEEE Power Electronics Specialists Conference, Mar. 1989, pp. 423-432.

Primary Examiner—Steven L. Stephan
Assistant Examiner—Jeffrey Sterrett
Attorney, Agent, or Firm—Walter F. Dawson; Richard M. Sharkansky

[57] ABSTRACT

A two-stage, Class E, fixed frequency, resonant, DC-to-DC power converter employing phase-shift control achieves outstanding performance over a full range from no load to full load. Each stage of the DC-to-DC power converter comprises a series inductor-diode network in parallel with a feed choke. Such network is connected between a power source input and a switching transistor, and it provides a fast discharge path for a resonant capacitor and lossless turn-on of the switching transistor in each power converter stage.

24 Claims, 7 Drawing Sheets

CLASS E FIXED FREQUENCY CONVERTER

BACKGROUND OF THE INVENTION

This invention relates to tuned switching power amplifiers and in particular to a Class E, fixed frequency resonant converter with phase-shift control.

In the prior art a high-efficiency, tuned, single-ended, switching mode amplifier employing an active device switch driver at a frequency determined by an A.C. input signal wherein the active device switch controls the application of direct current power to a load through a resonant load network is disclosed in U.S. Pat. No. 3,919,656, issued to Nathan O. Sokal et al. on Nov. 11, 1975. Sokal et al. describes a tuned power amplifier which avoids by design the simultaneous imposition of substantial voltage and substantial current on the switch, even during switching intervals of substantial duration, through the use of a load network synthesized to yield an optimal transient response to the cyclic operation of the switch; this results in maximizing power efficiency even if the active device switching times are substantial fractions of the AC cycle. Sokal et al describes the load network operation for achieving a high-efficiency tuned switching power amplifier as Class E operation. The optimum operation satisfies the following criteria when the active device switch is a transistor: a) the rise of the voltage across the transistor at turn-off should be delayed until after the transistor is off; b) the collector voltage should be brought back to zero at the transistor turn-on; and c) the slope of the collector voltage should be zero at the time of turn-on. However, this basic tuned power amplifier remains in an optimum mode of operation only within a limited load and input line range. It is generally considered unsuitable for DC-to-DC converter applications since it requires a relatively critical load impedance to keep conduction losses low. Also, the basic Class E converter operates only with frequency modulation (FM) control. In addition, two stages connected in a push-pull configuration cannot operate with fixed frequency phase-shift control while maintaining the optimum mode of operation.

The application of two Class E amplifiers in a push-pull configuration is disclosed in an article entitled "Idealized Operation of the Class E Tuned Power Amplifier" by Frederick H. Raab, IEEE Transactions on Circuits and Systems, Vol. CAS-24, No. 12, December 1977, pp 725-735. Raab shows an arrangement of two basis Class E circuits to form a push-pull Class E amplifier in order to obtain a larger power output. The two circuits are driven with opposite phases via a transformer. Each circuit operates as if it were a single transistor Class E amplifier. The voltage appearing on the secondary winding of an output transformer contains both a positive and negative "Class E" shape. Consequently the output voltage amplitude has twice the amplitude of the signal at the collector of each single transistor Class E amplifier. However, this push-pull Class E tuned power amplifier has a limited load range as does the Sokal et al. basic Class E converter and it cannot regulate the output power using fixed frequency control.

Class E converters operating with frequency modulation (FM) control suffer from a variety of disadvantages. A wide range of switching frequency is often required to maintain output regulation. Wideband noise generated by the converter complicates EMI filtering as well as system design. At light loads, the operating frequency is reduced. This in turn reduces the closed-loop bandwidth of a converter and slows down the transient response. An FM controlled circuit is subject to entrainment which occurs when the FM controller locks on the frequency of a pulsatory load, resulting in an increase in output ripple. Limited data describing this phenomenon makes it particularly risky to supply a dynamic load with negative impedance from an FM regulated converter. Power supplies with FM control can be synchronized only when they share a common load. Unsynchronized converters feeding sections of a densely packaged system can generate broadband beat frequencies. If these frequencies are within the passband of a power supply, a significant increase in the output ripple voltage may result. The control characteristic of the FM control is non-linear in the continuous conduction mode, i.e., the small-signal gain drastically changes when the load current is changed. To avoid these disadvantages of FM control, fixed frequency control has been proposed.

In order to overcome the disadvantages of a Class E resonant converter with FM control, fixed frequency control is described in an article entitled, "Steady State Analysis of Class E Resonant DC-DC Converter Regulated Under Fixed Switching Frequency" by Koosuke Harada and Wen-Jian Gu, Power Electronics Specialists Conference, April 1988, pp. 3-8. Here, Harada et al. describe a Class E resonant DC-DC converter which is regulated by an auxiliary switch and the switching frequency of the converter is fixed. Auxiliary switches are used to modulate resonant frequency in order to regulate resonant converters. However, this approach does not provide output regulation at light loads.

In an article entitled "Class-E Combined-Converter by Phase-Shift Control" by Chuan-Qiang Hu et al., Power Electronics Specialists Conference, PESC '89, June 1989, pp. 229-234, a Class E combined-converter is described which can be easily regulated for both wide load and wide line voltage variations while the switching frequency and the tank resonant frequency are both fixed. Such converter is a parallel combination of two conventional Class E converters. Both units operate at the same switching frequency with an adjustable phase-shift angle $\alpha$ from 0° to 180° between them allowing control of the output power. The feedback control is claimed to be simpler than that described in the Harada article. However, this Class E combined converter has poor regulation at light loads, but the light load regulation of this circuit is several times better than the regulation of the Harada et al. circuit. In addition, as is common to all converters with vector summing control, one of the section inverters must be designed somewhat oversized to account for a poor apparent load power factor.

SUMMARY OF THE INVENTION

Accordingly, it is therefore an object of this invention to provide high efficiency Class E fixed frequency, resonant converter with phase-shift control operating in an optimum mode which generates an output voltage over a range of no load to full load.

It is a further object of this invention to provide a high efficiency two-stage Class E, fixed frequency DC-to-DC power converter operating in an optimum mode which generates a regulated output voltage using an output feedback signal and phase-shift control over a range of no load to full load.

It is a further object of this invention to provide a Class E tuned power amplifier having an inductor-diode circuit to provide a fast discharge path for resonant capacitance in the amplifier.

The objects are further accomplished by providing a Class E power converter operating in an optimum mode over a range of no load to full load comprising a DC power source ($V_{IN}$), first inverter means coupled to the DC power source for generating a positive half of a sinusoidal voltage in accordance with a first fixed frequency input signal, the first inverter means comprising a first network means for providing a fast discharge path for capacitance in the first inverter means, second inverter means coupled to the DC power source for generating a negative half of the sinusoidal voltage in accordance with a second fixed frequency input signal, the second inverter means comprising a second network means for providing a fast discharge path for capacitance in the second inverter means, and series resonant means coupled to the first inverter means output and the second inverter means output for providing a fundamental frequency of the generated sinusoidal voltage to an output load. The power converter comprises a regulator for regulating the output voltage by phase-shift control of the first fixed frequency input signal and the second fixed frequency input signal. The regulator comprises a phase-shift modulator means for sensing the output voltage and generating the first fixed frequency input signal and the second fixed frequency input signal. The series resonant means comprises an inductor coupled to a capacitor whereby the coupling of the inductor to the capacitor is performed by inserting a primary winding of a transformer between the inductor and the capacitor. The first network means comprises an inductor in series with a diode for providing a current path when the first inverter output voltage plus the voltage across the inductor exceeds the power source voltage ($V_{IN}$). The second network means comprises an inductor in series with a diode for providing a current path when the second inverter output voltage plus the voltage across the inductor exceeds the power source voltage ($V_{IN}$).

The objects are further accomplished by providing a Class E DC-to-DC power converter operating in an optimum mode over a range of no load to full load comprising a DC power source ($V_{IN}$), first inverter means coupled to the DC power source for generating a positive half of a sinusoidal voltage in accordance with a first fixed frequency input signal, the first inverter means comprising a first network means for providing a fast discharge path for capacitance in the first inverter means, second inverter means coupled to the DC power source for generating a negative half of the sinusoidal voltage in accordance with a second fixed frequency input signal, the second inverter means comprising a second network means for providing a fast discharge path for capacitance in the second inverter means, and series resonant means coupled to the first inverter means output and the second inverter means output for providing a fundamental frequency of the generated sinusoidal voltage to an output load. The power converter comprises a regulator for regulating the output voltage by phase-shift control of the first fixed frequency input signal and the second fixed frequency input signal. The regulator comprises a phase-shift modulator means for sensing the output voltage and generating the first fixed frequency input signal and the second fixed frequency input signal. The series resonant means comprises an inductor coupled to a capacitor whereby the coupling of the inductor to the capacitor is performed by inserting a primary winding of a transformer between the inductor and the capacitor. The converting means comprises a full wave rectifier means coupled to a secondary winding of the transformer. The first network means comprises an inductor in series with a diode for providing a current path when the first inverter output voltage plus the voltage across the inductor exceeds the power source voltage ($V_{IN}$). The second network means comprises an inductor in series with a diode for providing a current path when the second inverter output voltage plus the voltage across the inductor exceeds the power source voltage ($V_{IN}$).

The objects are further accomplished by a method for providing a Class E DC-to-DC power converter operating in an optimum mode over a range of no load to full load comprising the steps of providing a DC power source ($V_{IN}$), generating a positive half of a sinusoidal voltage in accordance with a first fixed frequency input signal with a first inverter means coupled to the DC power source, the first inverter means comprising a first network means for providing a fast discharge path for capacitance in the first inverter means, generating a negative half of the sinusoidal voltage in accordance with a second fixed frequency input signal with a second inverter means coupled to the DC power source, the second inverter means comprising a second network means for providing a fast discharge path for capacitance in the second inverter means, providing a fundamental frequency of the generated sinusoidal voltage to an output load with a series resonant means coupled to the first inverter means output and the second inverter means output, and converting the sinusoidal voltage to a DC voltage output with means coupled to the series resonant means. The method further comprises the step of regulating the output voltage by phase-shift control of the first fixed frequency input signal and the second fixed frequency input signal. The regulating step further comprises sensing the output voltage and generating the first fixed frequency input signal and the second fixed frequency input signal with phase-shift modulator means. The step of converting the sinusoidal voltage to a DC voltage includes coupling a full wave rectifier means to a secondary winding of the transformer, the primary of the transformer being coupled to the series resonant means. The step of providing a fast discharge path for capacitance in the first network means, which includes an inductor in series with a diode, comprises providing a current path when the first inverter output voltage plus the voltage across the inductor exceeds the power source voltage ($V_{IN}$). The step of providing a fast discharge path for capacitance in the second network means which includes an inductor in series with a diode comprises providing a current path when the second inverter output voltage plus the voltage across the inductor exceeds the power source voltage ($V_{IN}$).

BRIEF DESCRIPTION OF THE DRAWINGS

Other and further features and advantages of the invention will become apparent in connection with the accompanying drawings wherein.

DESCRIPTION OF THE PREFERRED EMBODIMENT

Figure 1:
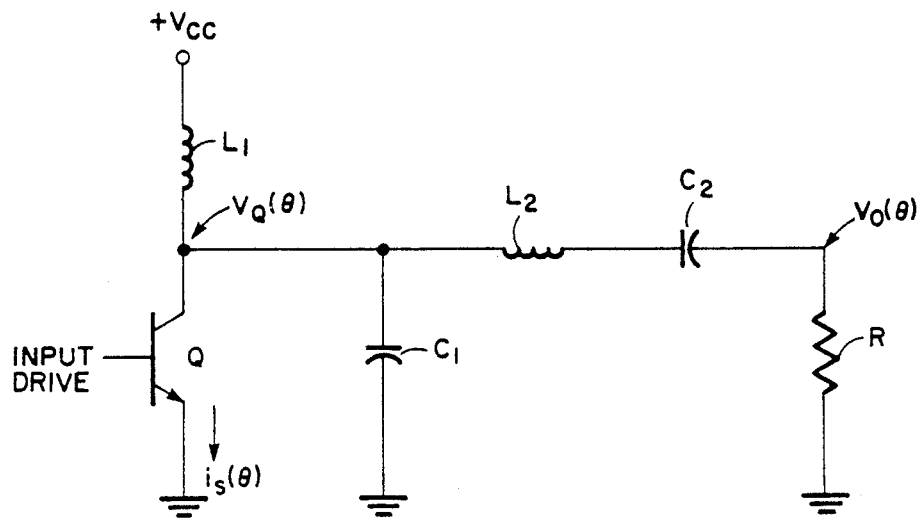
FIG. 1 is a circuit diagram of a simple Class E tuned power amplifier.
Figure 2:
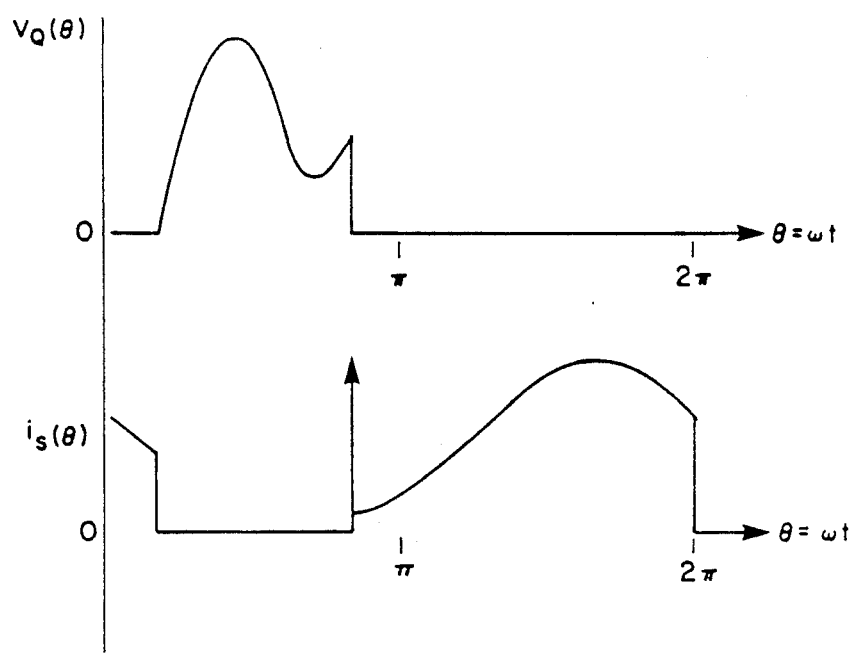
FIG. 2 depicts voltage $V_Q(\theta)$ across a switch Q and a switching current $i_s(\theta)$ of the Class E tuned power amplifier in FIG. 1.

Referring to FIG. 1 and FIG. 2, FIG. 1 shows a circuit diagram for a simple Class E tuned power amplifier well known in the art and described in U.S. Pat. No. 3,919,656, issued to Nathan O. Sokal et al. on Nov. 11, 1975. The Class E operation refers to a tuned power amplifier comprising a single pole switch and a load network. The switch comprises an active device (Q) (e.g., bipolar or field-effect transistor). The load network comprises a resonant circuit of L2 and C2, in series with a load (R), and a capacitor ($C_1$), shunts the switch. $C_1$ represents capacitance inherent in the active device, stray capacitance and capacitance provided by the load network. L1 is an RF choke. FIG. 2 shows a transistor voltage $V(\theta)$ waveform and a switch current $i_s(\theta)$ waveform passing through the transistor Q as an input drive signal causes the transistor Q to turn-on. Of particular interest is the voltage step that occurs in $V(\theta)$ due to the current transient that occurs when the transistor Q is being turned-on by the input drive signal. Such voltage step across the transistor Q is caused by an incomplete discharge of the total shunt capacitance $C_1$. An impulse discharge of the capacitor $C_1$ through the transistor Q generates considerable switching losses and essentially defeats the purpose of using a Class E converter.

Figure 3:
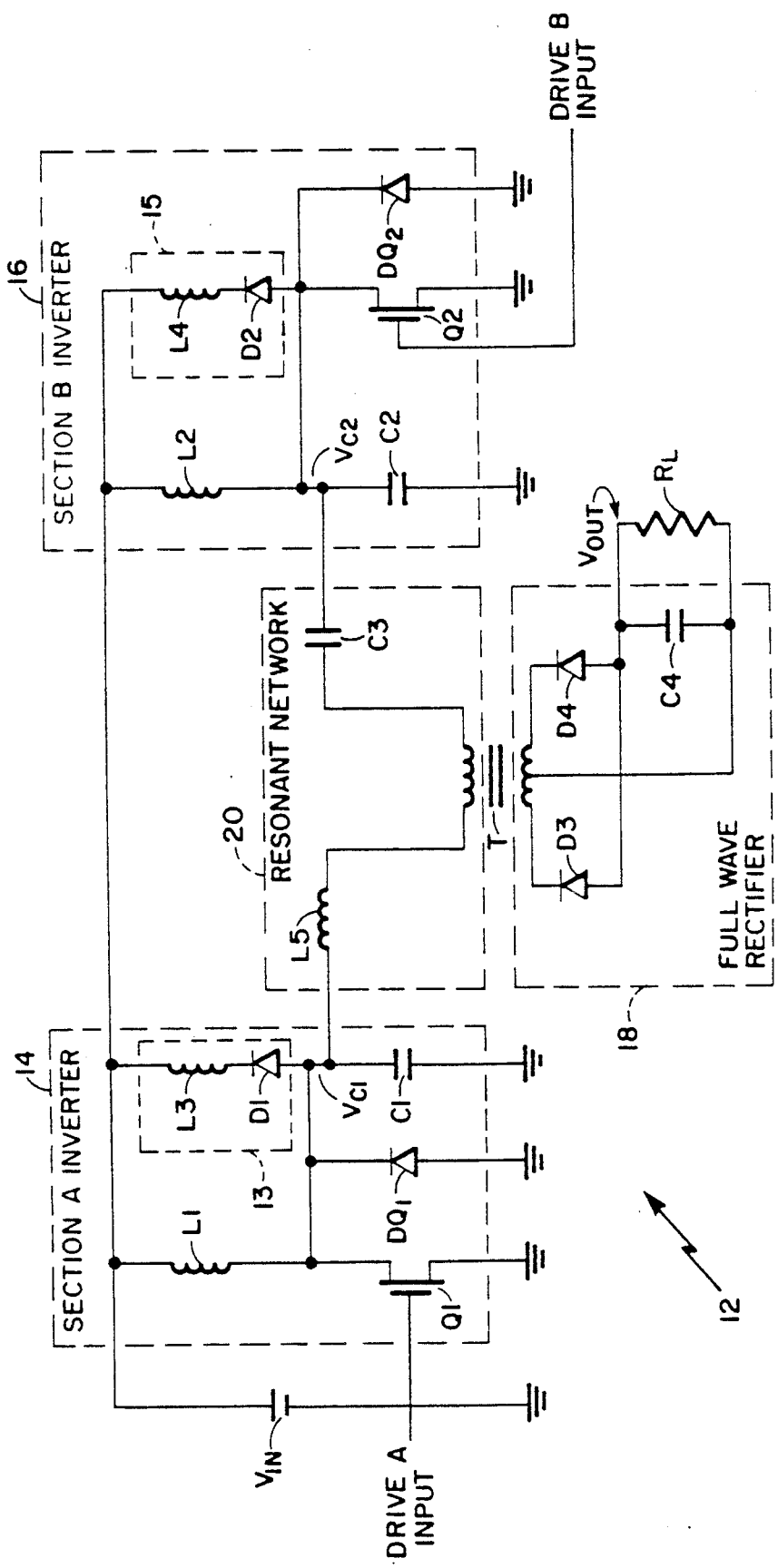
FIG. 3 is a circuit diagram of the invention embodying a two-stage Class E fixed frequency resonant converter.
Figure 4:
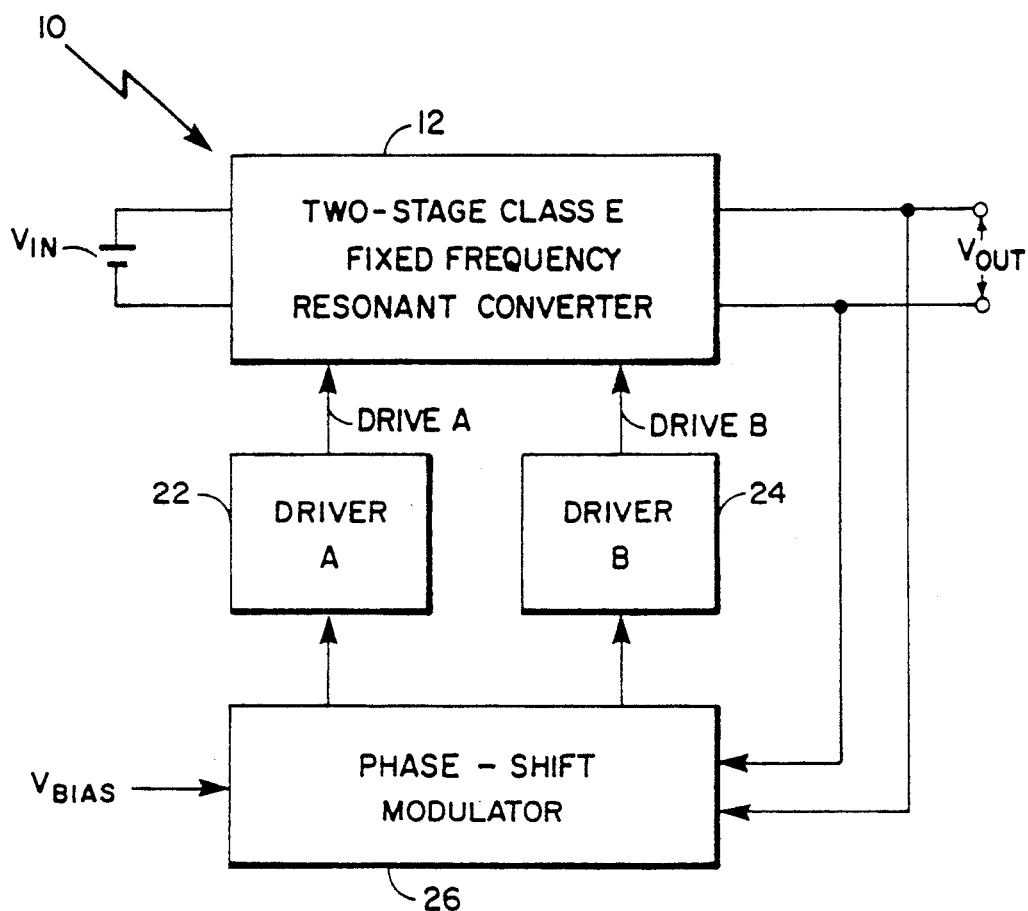
FIG. 4 is a block diagram of the two-stage Class E fixed frequency resonant converter invention coupled to phase-shift control circuits.

Referring now to FIG. 3 and 4, FIG. 3 is a circuit diagram of a two-stage, Class E, fixed frequency, resonant converter 12 which is shown embodying the principles of the invention. FIG. 4 is a block diagram embodying the invention showing the two-stage Class E converter 12 coupled to phase-shift control circuits comprising a driver A 22, a driver B 24 and a phase-shift modulator 26. The Class E converter 12 operates in an optimum mode when its operation satisfies the following criteria and the active device switch is a transistor: a) the rise of the voltage across the transistor at turn-off should be delayed until after the transistor is off; b) the voltage across the transistor should be brought back to zero at the transistor turn-on; and c) the slope of the voltage across the transistor should be zero at the time of turn-on. The Class E resonant converter 12 as shown in FIG. 3 comprises a section A inverter 14 which receives a drive A input and a section B inverter 14 which receives a drive B input. The recommended duty cycle for both the drive A input and the drive B input signal is 50%, although other duty cycles may be used. The section A inverter 14 generates a positive half of a sinusoidal waveform voltage ($V_{C1}$) and the section B inverter generates a negative half of the sinusoidal waveform voltage ($V_{C2}$). The section A inverter 1 output ($V_{C1}$) is connected to an inductor L5 which is coupled to one end of the primary winding of a transformer (T). The section B inverter 16 output ($V_{C2}$) is connected to a capacitor $C_3$ which is serially connected to the other end of the primary winding of transformer (T). The series combination of L5 and C3 provides a series resonant network 20 which acts as a bandpass filter allowing only the fundamental frequency current to flow to the circuit output. The secondary winding of transformer T is coupled to a full wave rectifier 18 which is connected to a load $R_L$. The full wave rectifier 18 is a conventional rectifier with a capacitive filter known to one skilled in the art. However, other rectifiers may be used including a zero voltage switching resonant Class E rectifier described in U.S. Pat. No. 4,685,041, issued Aug. 4, 1987, to W. C. Bowman et al. entitle "Resonant Rectifier Circuit", and assigned to American Telephone and Telegraph Company, AT&T Bell Laboratories. Also, a rectifier may be used such as is described in an article entitled "Class $E^2$ Narrow-Band Resonant DC/DC Converters", by M. Kazimierczuk and J. Jozwik, IEEE Transactions on Instrumentation and Measurement, Vol. 38, No. 6, December 1989, pp. 1064–1068.

The section A inverter 14 is similar to the tuned power amplifier of FIG. 1 in that it comprises an active device Q1, which is a MOSFET transistor, and a capacitor C1 connected in parallel with Q1. Also connected inversely in parallel with Q1 is a diode DQ1. An inductor L1 is connected in series between the active device Q1 and a direct current (DC) power source ($V_{IN}$) and L1 functions as a feed choke. A series-diode network 13 is connected in parallel with L1 and comprises an inductor L3 in series with a diode D1. The output of the section A inverter $V_{C1}$ is connected to the inductor L5 of the series resonant network 20.

The section B inverter 16 comprises an active device Q2, which is a MOSFET transistor and a capacitor C2 connected in parallel with Q2. Also connected inversely in parallel with Q2 is a diode DQ2. An inductor L2 is connected in series between the active device Q2 and the DC power source ($V_{IN}$) and L2 functions as a feed choke. A series-diode network 15 is connected in parallel with L2 and comprises an inductor L4 in series with a diode D2. The output of the section B inverter $V_{C2}$ is connected to the capacitor C3 of the series resonant network 20.

The improvement provided by the present invention in the Class E fixed frequency converter of FIG. 3 is the addition of the series inductor-diode networks 13 and 15 in parallel with the each inductor L1 and L2 respectively. In particular, in the section A inverter 14 the series L3 and D1 network 13 is connected in parallel with L1, and in section B inverter 16 the series L4 and D2 network 15 is connected in parallel with L2. These inductor-diode networks 13, 15 provide a fast discharge path for resonant capacitors C1 and C2, thereby providing for a lossless turn-on of the transistors Q1 and Q2 under a wide range of load conditions. The lossless turn-on of transistors Q1 and Q2 enables the use of increased switching frequencies and consequently the reduction of magnetic and filter components sizes thereby increasing the practicality of distributed power supplies in electronic systems.

Figure 6:
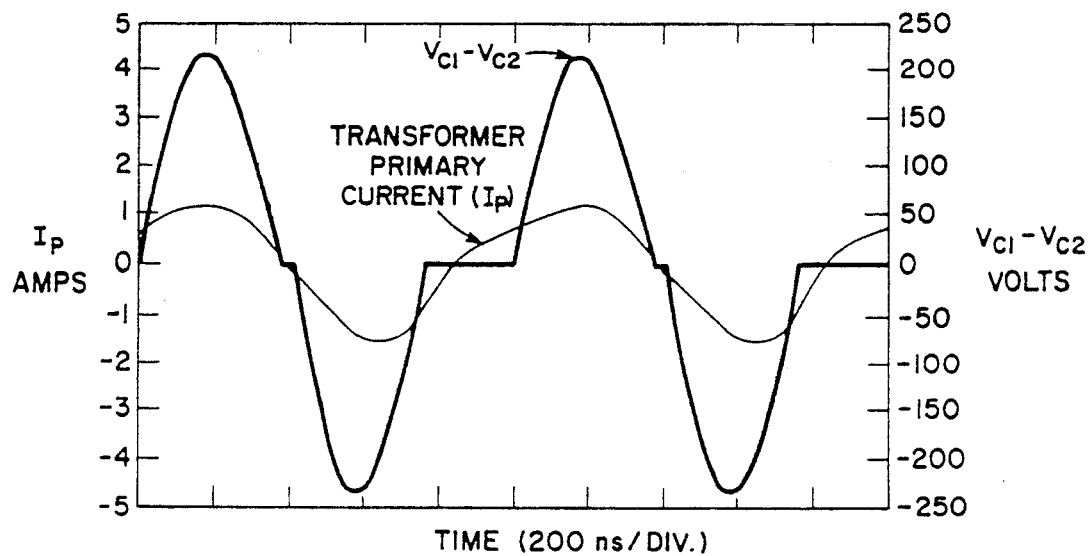
FIG. 6 depicts $V_{C1}$-$V_{C2}$ voltage and transformer primary current $(I_p)$ waveforms, respectively illustrating the principles of the present invention in FIG. 3 under full load.
Figure 7:
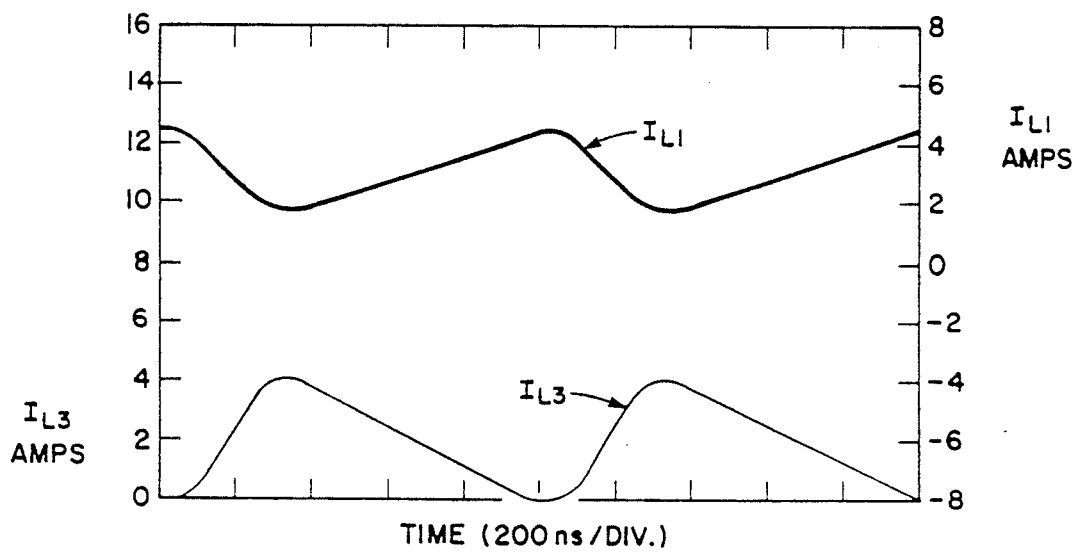
FIG. 7 illustrates the $I_{L1}$ and $I_{L3}$ current waveforms at full load of the circuit shown in FIG. 3.

Referring to FIG. 3, FIG. 6 and FIG. 7, the Class E converter 12 operation as shown in FIG. 3, is described here assuming a full phase-shift angle ($\alpha = 180°$) in order to facilitate understanding the converter 12 operation and because the converter design decouples the section A inverter 14 from the section B inverter 16. However, FIGS. 6-12 show operating waveforms of the preferred embodiment in FIG. 3 and FIG. 4 with a minimum phase-angle of 24 degrees and a maximum phase-angle of 150 degrees. When the transistor Q1 of the section A inverter 14 is turned-on, the current $I_{L1}$ starts building up in the feed inductor L1. Such $I_{L1}$ current has the shape of a linearly increasing ramp as shown in FIG. 7. During this time the energy is stored in the feed inductor L1, no energy is supplied to the series resonant network 20 load by the section A inverter 14. No current flows through the capacitor C1, and the voltage across it is zero. When the switch 01 turns-off, the current flowing through the inductor L1 is diverted from Q1 to the capacitor C1. Thus, the energy stored in the inductor L1 is transferred to the capacitor C1 and delivered to the load. FIG. 6 shows the voltage waveform $V_{C1}-V_{C2}$ and the transformer primary current waveform ($I_p$) when the converter 12 comprising the inductor-diode networks 13, 15 is operating at full load.

Referring to FIG. 3 and FIG. 7, when the capacitor voltage $V_{C1}$ plus the voltage across the inductor L3 exceeds $V_{IN}$, the diode D1 turns-on, and part of the stored energy in L1 is gradually returned to the input voltage source $V_{IN}$. A series resonant tank formed by C1 and $L_{eqv}$, where $L_{eqv}=L1*L3/(L1+L3)$, shapes the capacitor current as a distorted sine wave. FIG. 7 shows the $I_{L1}$ waveform in L1 and the $I_{L3}$ in L3 when the Class E converter 12 is operating at full load. As a result of the inventive concept, there are no sharp edges in the $I_{L1}$ and $I_{L3}$ waveforms due to abrupt changes of current. Also, there is no indication of electromagnetic interference (EMI) and noise normally associated with switching power supplies. When the capacitor voltage ($V_{C1}$) passes through its peak value, the current becomes negative and starts discharging capacitor (C1). This is a critical time interval, since if the discharge isn't complete by the time the transistor switch Q1 turns-on, significant power loss will result. The series L3 and D1 network 13 allows a fast discharge of the resonant capacitor C1 and ensures a lossless turn-on of the switch Q1.

Figure 8:
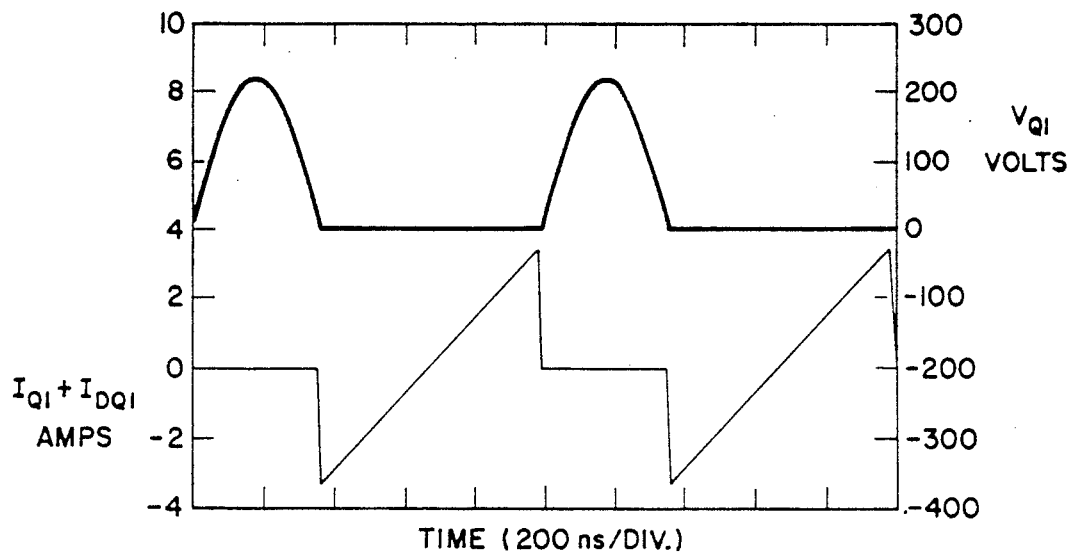
FIG. 8 illustrates the $I_{Q1}$ current waveform and $V_{Q1}$ voltage waveform at no load of the circuit shown in FIG. 3.
Figure 9:
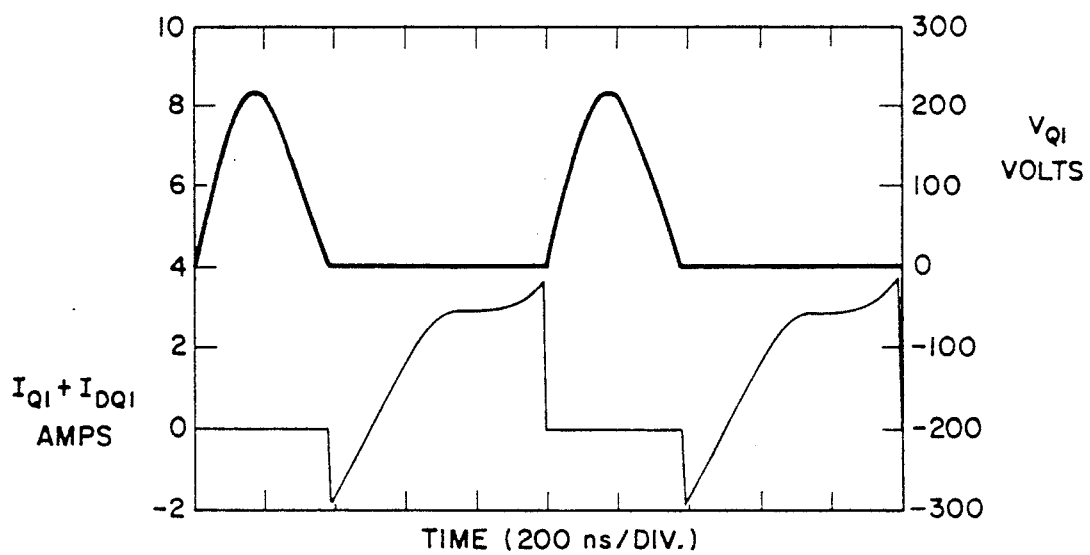
FIG. 9 illustrates the $I_{Q1}$ current waveform and the $V_{Q1}$ voltage waveform at full load of the circuit shown in FIG. 3.
Figure 12:
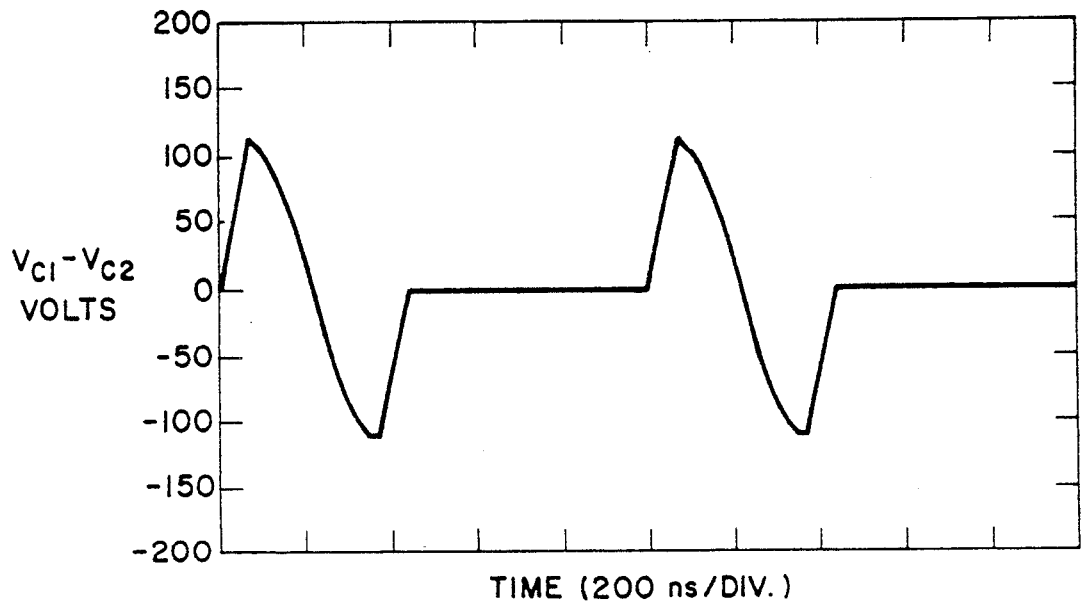
FIG. 12 illustrates the $V_{C1}$-$V_{C2}$ voltage waveforms at no load of the circuit shown in FIG. 3.

Referring now to FIG. 3, FIG. 8 and FIG. 9, FIG. 8 shows the $V_{C1}$ voltage waveform and the $I_{Q1}+I_{DQ1}$ current waveform with no load on the Class E converter 12, and FIG. 12 shows the $V_{C1}$ voltage waveform and the $I_{Q1}+I_{DQ1}$ current waveform with full load on the Class E converter 12. When the voltage across the capacitor ($V_{C1}$) decreases to zero, the inverse parallel diode DQ1 turns on automatically and starts conducting the negative current $I_{DQ1}$ which flows through a parallel combination of L1 and L3. When the $I_{Q1}+I_{QD1}$ turns positive again, Q1 starts conducting $I_{Q1}$ at zero voltage. Therefore, as shown in FIGS. 8 and 9, the turn-on switching loss is zero. The turn-on of Q1 completes one cycle of operation and stops the energy flow to the output from the section A inverter 14.

The operation of section B inverter 16 is analogous to the description of the section A inverter 14. If the phase-shift angle between the two section A and B inverters 14, 16 is 180°, an alternate charging of capacitors C1 and C2 delivers positive and negative half-cycles of power to the load $R_L$. The load $R_L$ is connected to the section A and section B inverters 14, 16 through the series resonant network 20 comprising L5 and C3. This network 20 as previously pointed out acts as a band-pass filter, and allows only the fundamental frequency current to flow to the output.

Figure 10:
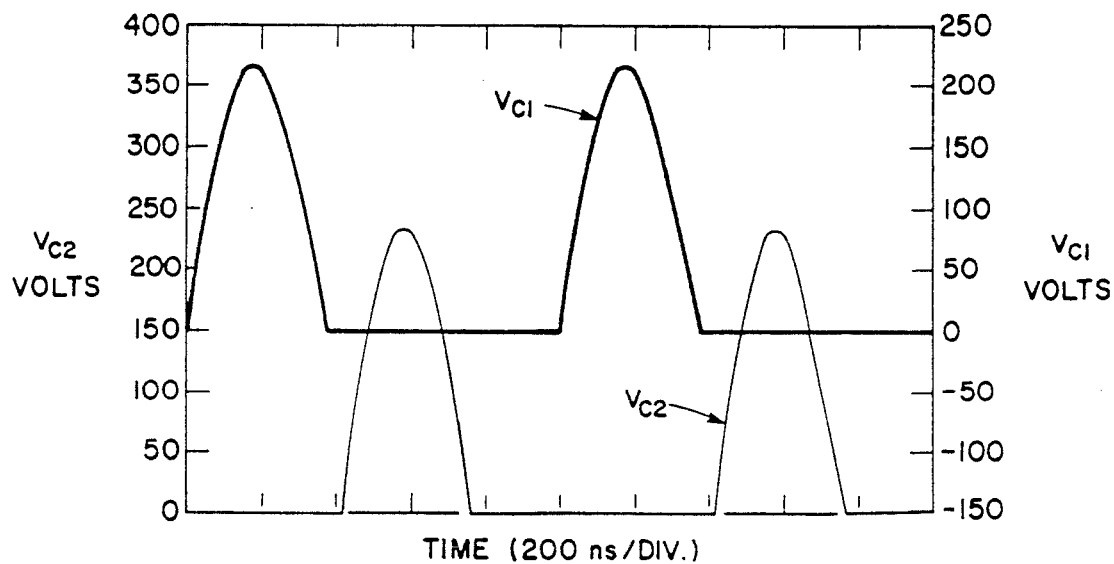
FIG. 10 illustrates the $V_{C1}$ and $V_{C2}$ voltage waveforms at full load of the circuit shown in FIG. 3.
Figure 11:
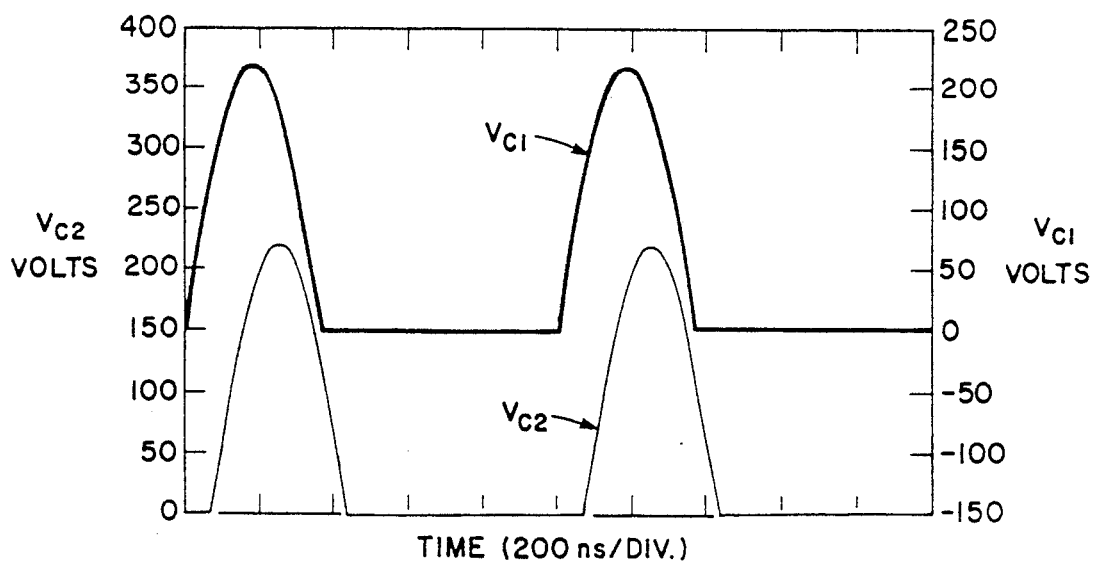
FIG. 11 illustrates the $V_{C1}$ and $V_{C2}$ voltage waveforms at no load of the circuit shown in FIG. 3.

Referring now to FIG. 3, FIG. 10 and FIG. 11, FIG. 10 and FIG. 11 show the individual $V_{C1}$ and $V_{C2}$ voltage waveforms of the Class E converter 12 at full load and no load respectively. These waveforms show that no switching losses result from the step discharge of C1 and C2.

The method for selecting values for the circuit components in FIG. 3 is as follows:

(a) Select the switching frequency Fs. The resonant frequency of the series network L5 and C3 should equal the switching frequency. Calculate the resonant frequency of the section inverter by Fo=1.6 Fs.

(b) Select a K factor, $K=V_{C1(PEAK)}/V_{IN}$. Recommended values of K are from 4 to 5.

(c) Calculate the resonant capacitor value:

$$C1 = P_{out}/(0.34\ K^2 V_{in}^2 \pi Fs)$$

(d) Calculate the equivalent inductance $L_{eqv}$.

$$L_{eqv} = 1/(4\pi^2 Fo^2 C1)$$

Figure 13:
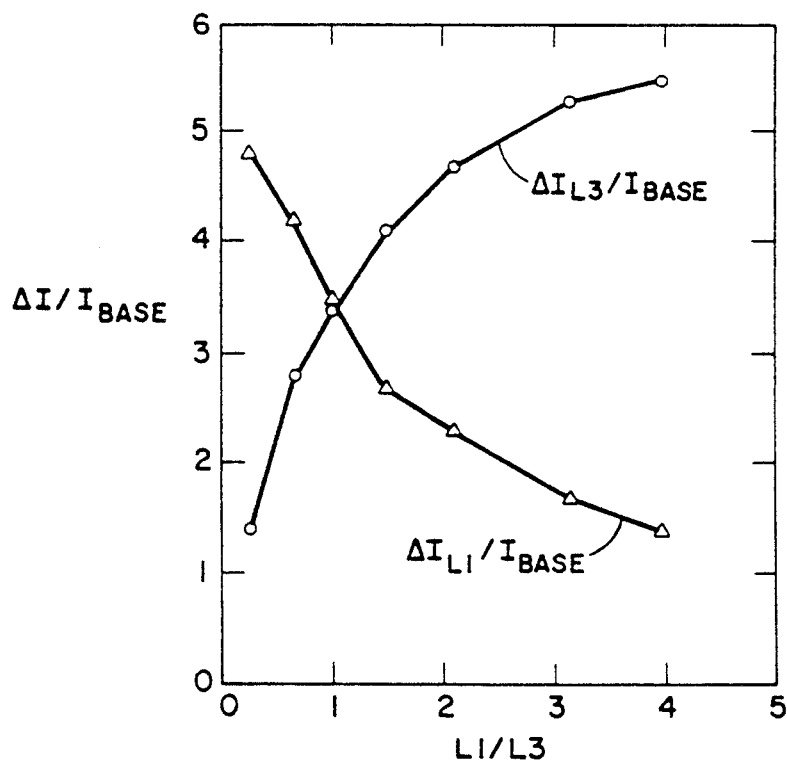
FIG. 13 shows a plot of normalized peak-to-peak ripple currents in the inductors L1 and L3 versus the ratio L1/L3, which is used for selecting values of L1 and L3.

(e) Calculate the output transformer turns ratio N where $N=\sqrt{Z1/QF1R_L}$ using value of the quality factor QF1=0.34 and $Z1=\sqrt{L_{eqv}/C1}$. (N=N1/N2, where N1 = number of primary turns, and N2 = Number of secondary turns);

(f) Select values of the feed inductor L1 and the energy recovery inductor L3 using the value of the equivalent inductance $L_{eqv}=L1*L3/L1+L3$ and design curves shown in FIG. 13 where $I_{BASE}=V_{IN}/Z1$; and (g) Calculate values of the series resonant network components L5 and C3 using Fs and QF2=5QF1.

The values of the circuit components and the particular semiconductor devices used in the present invention as shown in FIG. 3 at the 1 Mhz switching frequency are as follows:

| Circuit Components | Description |
| --- | --- |
| L1, L2 | 12 µH |
| L3, L4 | 8 µH |
| C1, C2 | 2 nF, 500 V |
| L5 | 37 µH |
| C3 | 680 pF, 500 V |
| C4 | 20 µF, 500 V |
| Q1, Q2 | MOSFET PN. IRFP360 from International Rectifier |
| D3, D4 | Schottky, PN. 63CNQ100 from International Rectifier |
| T | N1 = 12, N2 = 1. Core: Type PQ. PN. 42016, Material K from |

| Circuit Components | Description |
|---|---|
| | Magnetics of Butler, PA |

Figure 5:
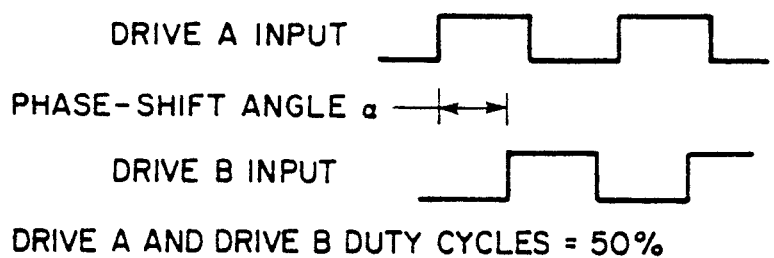
FIG. 5 shows the timing signals generated by a phase-shift modulator to generate a phase-shift angle, $\alpha$.

Referring now to FIG. 4, FIG. 5 and FIG. 12, the 2-stage Class E fixed frequency resonant converter 12 shown in FIG. 4 operates with a switching frequency (F") equal to 1 Mhz and an input voltage ($V_{IN}$) range of 45 to 55 VDC and provides an output voltage ($V_{OUT}$) of 10 volts at 10 amps. FIG. 12 shows a very stable $V_{C1}-V_{C2}$ voltage waveform with no load on the two-stage Class E converter 12 which results from the effects of the series inductor-diode networks 13, 15. Drive A 22 and Drive B 24 circuits shown in FIG. 4 provide a 1 Mh, fixed frequency to MOSFET driver Q1 and Q2. As shown in FIG. 5 the phase-shift angle α generated by a phase-shift modulator 26 samples the output voltage ($V_{OUT}$) and provides the $V_{OUT}$ regulation control. No load and full load control is achieved in the present embodiment by varying the control angle α from 24 degrees to 150 degrees respectively, thereby minimizing the dynamic range required in a control section of the phase-shift modulator 26 and avoiding the need to skip pulses to achieve no load performance. The present invention provides a high efficiency Class E, fixed frequency power converter 12 having a no-load performance that is stable and predictable. As shown in FIGS. 7-12, the converter 12 exhibits clean waveforms free from the irregularities and noise associated with prior fixed-frequency switch-mode power supplies. The phase-shift modulator 26 shown in FIG. 4 is known to one skilled in the art and similar to that described in an article entitled "A 1 kW, 500 kHz Front-End Converter for a Distributed Power Supply System", by L. H. Mweene, IEEE Power Electronics Specialists Conference, March 1989, pp. 423-432. The two-stage, Class E converter 12 achieves approximately 80% efficiency at full load and a power density of 30 watts per cu. in. (excluding non-hybridized control circuitry such as the drivers 22, 24 and phase-shift modulator 26 circuits).

This concludes the description of the preferred embodiment of the invention. However, many modifications and alterations will be obvious to one of ordinary skill in the art without departing from the spirit and scope of the inventive concept. For example, various types of impedance matching networks can be used for connecting the load $R_L$ to the section A and section B inverters 12 and 16. Also, various types of rectifiers as described hereinbefore may be used in the two-stage Class E power converter 12. Therefore, it is intended that the scope of this invention be limited only by the appended claims which follow.

What is claimed is:

1. A Class E power converter operating in an optimum mode over a range of no load to full load comprising:
    a DC power source ($V_{IN}$);
    first inverter means coupled to said DC power source for generating a positive half of a sinusoidal voltage in accordance with a first fixed frequency input signal, said first inverter means comprising a first network means for providing a fast discharge path for capacitance in said first inverter means;
    second inverter means coupled to said DC power source for generating a negative half of said sinusoidal voltage in accordance with a second fixed frequency input signal, said second inverter means comprising a second network means for providing a fast discharge path for capacitance in said second inverter means; and
    series resonant means coupled to said first inverter means output and said second inverter means output for providing a fundamental frequency of said generated sinusoidal voltage to an output load.

2. The power converter as recited in claim 1 wherein: said power converter comprises a regulator means for regulating said output voltage at said load by phase-shift control of said first fixed frequency input signal and said second fixed frequency input signal.

3. The power converter as recited in claim 2 wherein: said regulator means comprises a phase-shift modulator means for sensing said output voltage and generating said first fixed frequency input signal and said second fixed frequency input signal.

4. The power converter as recited in claim 1 wherein: said series resonant means comprises an inductor coupled to a capacitor; and
    said coupling of said inductor to said capacitor is performed by inserting a primary winding of a transformer means between said inductor and said capacitor.

5. The power converter as recited in claim 1 wherein: said first inverter means comprises a first switching means coupled to a first input of said series resonant means.

6. The power converter as recited in claim 1 wherein: said second inverter means comprises a second switching means coupled to a second input of said series resonant means.

7. The power converter as recited in claim 1 wherein: said first network means comprises an inductor in series with a diode for providing a current path when said first inverter output voltage plus the voltage across said inductor exceeds said power source voltage ($V_{IN}$).

8. The power converter as recited in claim 1 wherein: said second network means comprises an inductor in series with a diode for providing a current path when said second inverter output voltage plus the voltage across said inductor exceeds said power source voltage ($V_{IN}$).

9. A Class E DC-to-DC power converter operating in an optimum mode over a range of no load to full load comprising:
    a DC power source ($V_{IN}$);
    first inverter means coupled to said DC power source for generating a positive half of a sinusoidal voltage in accordance with a first fixed frequency input signal, said first inverter means comprising a first network means for providing a fast discharge path for capacitance in said first inverter means;
    second inverter means coupled to said DC power source for generating a negative half of said sinusoidal voltage in accordance with a second fixed frequency input signal, said second inverter means comprising a second network means for providing a fast discharge path for capacitance in said second inverter means; and
    series resonant means coupled to said first inverter means output and said second inverter means output for providing a fundamental frequency of said generated sinusoidal voltage to an output load.

10. The power converter as recited in claim 9 wherein:
said power converter comprises a regulator means for regulating said output voltage at said load by phase-shift control of said first fixed frequency input signal and said second fixed frequency input signal.

11. The power converter as recited in claim 10 wherein:
said regulator means comprises a phase-shift modulator means for sensing said output voltage and generating said first fixed frequency input signal and said second fixed frequency input signal.

12. The power converter as recited in claim 9 wherein:
said series resonant means comprises an inductor coupled to a capacitor; and
said coupling of said inductor to said capacitor is performed by inserting a primary winding of a transformer means between said inductor and said capacitor.

13. The power converter as recited in claim 12 wherein:
said converting means comprises a full wave rectifier means coupled to a secondary winding of said transformer means.

14. The power converter as recited in claim 9 wherein:
said first inverter means comprises a first switching means coupled to a first input of said series resonant means.

15. The power converter as recited in claim 9 wherein:
said second inverter means comprises a second switching means coupled to a second input of said series resonant means.

16. The power converter as recited in claim 9 wherein:
said first network means comprises an inductor in series with a diode for providing a current path when said first inverter output voltage plus the voltage across said inductor exceeds said power source voltage ($V_{IN}$).

17. The power converter as recited in claim 9 wherein:
said second network means comprises an inductor in series with a diode for providing a current path when said second inverter output voltage plus the voltage across said inductor exceeds said power source voltage ($V_{IN}$).

18. A method for providing a Class E DC-to-DC power converter operating in an optimum mode over a range of no load to full load comprising the steps of:
providing a DC power source ($V_{IN}$);
generating a positive half of a sinusoidal voltage in accordance with a first fixed frequency input signal with a first inverter means coupled to said DC power source, said first inverter means comprising a first network means for providing a fast discharge path for capacitance in said first inverter means;
generating a negative half of said sinusoidal voltage ($V_{C2}$) in accordance with a second fixed frequency input signal with a second inverter means coupled to said DC power source, said second inverter means comprising a second network means for providing a fast discharge path for capacitance in said second inverter means;
providing a fundamental frequency of said generated sinusoidal voltage to an output load with a series resonant means coupled to said first inverter means output and said second inverter means output; and
converting said sinusoidal voltage to a DC voltage output with means coupled to said series resonant means.

19. The power converter as recited in claim 18 wherein:
said step of providing a fast discharge path for capacitance in said second network means including an inductor in series with a diode comprises providing a current path when said second inverter output voltage plus the voltage across said inductor exceeds said power source voltage ($V_{IN}$).

20. The method as recited in claim 18 wherein:
said step of providing a fast discharge path for capacitance in said first network means including an inductor in series with a diode comprises providing a current path when said first inverter output voltage plus the voltage across said inductor exceeds said power source voltage ($V_{IN}$).

21. The method as recited in claim 18 wherein:
said method further comprises the step of regulating said voltage output by phase-shift control of said first fixed frequency input signal and said second fixed frequency input signal.

22. The method as recited in claim 21 wherein:
said regulating step further comprises sensing said output voltage and generating said first fixed frequency input signal and said second fixed frequency input signal with phase-shift modulator means.

23. The method as recited in claim 18 wherein said step of providing a fundamental frequency of said generated sinusoidal voltage to an output load includes a series resonant means comprising an inductor coupled to a capacitor; and
said coupling being performed by inserting a primary winding of a transformer means between said inductor and said capacitor.

24. The method as recited in claim 23 wherein:
said step of converting said sinusoidal voltage to a DC voltage includes coupling a full wave rectifier means to a secondary winding of said transformer means.

* * * * *